US012794249B2

(12) United States Patent
Aoyagi

(10) Patent No.: US 12,794,249 B2
(45) Date of Patent: Nov. 10, 2026

(54) CHARGING CIRCUIT

(71) Applicant: TOYOTA JIDOSHA KABUSHIKI KAISHA, Toyota (JP)

(72) Inventor: Shinsuke Aoyagi, Isehara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 527 days.

(21) Appl. No.: 18/528,468

(22) Filed: Dec. 4, 2023

(65) Prior Publication Data

US 2024/0283259 A1 Aug. 22, 2024

(30) Foreign Application Priority Data

Feb. 21, 2023 (JP) ................................. 2023-024864

(51) Int. Cl.
*H02J 7/00* (2026.01)
*H02J 7/50* (2026.01)
*H02J 7/92* (2026.01)

(52) U.S. Cl.
CPC .............. *H02J 7/575* (2026.01); *H02J 7/865* (2026.01); *H02J 7/92* (2026.01)

(58) Field of Classification Search
CPC ........................................................ H02J 7/575
USPC .......................................................... 320/117
See application file for complete search history.

(56) References Cited

U.S. PATENT DOCUMENTS 11,336,101 B2 5/2022 Hao et al.
2018/0337586 A1* 11/2018 Choi ..................... H02M 3/073
2018/0358896 A1* 12/2018 Puggelli ................ H02M 3/158
2019/0070971 A1 3/2019 Kusumi et al.
2019/0199114 A1* 6/2019 Tseng ...................... B60L 53/22
2019/0229616 A1 7/2019 Illiano
2022/0045618 A1 2/2022 Kumar et al.
2022/0294357 A1 9/2022 Channegowda et al.
2022/0368325 A1* 11/2022 Thomsen .............. H02M 3/071

FOREIGN PATENT DOCUMENTS

DE 10 2022 202 360 A1 9/2023
EP 3 952 092 A1 2/2022
JP 2000-350439 A 12/2000
JP 2019-047677 A 3/2019
KR 10-2022-0012059 A 2/2022
KR 10-2022-0017345 A 2/2022
WO WO 2022/056861 A1 2/2022

* cited by examiner

*Primary Examiner* — Yalkew Fantu

(74) *Attorney, Agent, or Firm* — Finnegan, Henderson, Farabow, Garrett and Dunner, LLP

(57) ABSTRACT

A first switch connects a series circuit made up of a coil and a third capacitor between a high-voltage terminal and an intermediate-voltage terminal. A second switch connects the series circuit between the intermediate-voltage terminal and a low-voltage terminal. A third switch connects the series circuit with a power supply. A controller switches a mode among the following three modes. In a first mode, the first switch is closed, and the second switch and the third switch are open. In a second mode, the second switch is closed, and the first switch and the third switch are open. In a third mode, the third switch is closed, and the first switch and the second switch are open. The controller controls the switches such that the mode is repeated in order of the third mode, the first mode, the third mode, and the second mode.

6 Claims, 13 Drawing Sheets

STATUSES OF SWITCHES IN THIRD MODE

| | |
|---|---|
| SW1 (21) | OPEN |
| SW2 (22) | OPEN |
| SW3 (23) | CLOSE |

STATUSES OF SWITCHES IN THIRD MODE

| | |
|---|---|
| SW1 (21) | OPEN |
| SW2 (22) | OPEN |
| SW3 (23) | CLOSE |

STATUSES OF SWITCHES IN FIRST MODE

| | |
|---|---|
| SW1 (21) | CLOSE |
| SW2 (22) | OPEN |
| SW3 (23) | OPEN |

STATUSES OF SWITCHES IN SECOND MODE

| | |
|---|---|
| SW1 (21) | OPEN |
| SW2 (22) | CLOSE |
| SW3 (23) | OPEN |

STATUSES OF SWITCHES IN FIRST MODE

| | |
|---|---|
| SW1 (21) | CLOSE |
| SW2 (22) | OPEN |
| SW3 (23) | OPEN |

STATUSES OF SWITCHES IN SECOND MODE

| | |
|---|---|
| SW1 (21) | OPEN |
| SW2 (22) | CLOSE |
| SW3 (23) | OPEN |

STATUSES OF SWITCHES IN FIRST MODE (POWER SUPPLY)

| | |
|---|---|
| SW1 (21a, 21b) | CLOSE |
| SW2 (22a, 22b) | OPEN |
| SW3 (23a, 23b) | OPEN |

NOTE:
SINCE CURRENT FLOWS THROUGH DIODE 34
AT 1A SWITCH 21a, 1A SWITCH 21a MAY BE OPEN

STATUSES OF SWITCHES IN THIRD MODE (POWER SUPPLY)

| | |
|---|---|
| SW1 (21a, 21b) | OPEN |
| SW2 (22a, 22b) | OPEN |
| SW3 (23a, 23b) | CLOSE |

NOTE:
SINCE CURRENT FLOWS THROUGH DIODE 36
AT 3A SWITCH 23a, 3A SWITCH 23a MAY BE OPEN

STATUSES OF SWITCHES IN SECOND MODE (POWER SUPPLY)

| | |
|---|---|
| SW1 (21a, 21b) | OPEN |
| SW2 (22a, 22b) | CLOSE |
| SW3 (23a, 23b) | OPEN |

NOTE:
SINCE CURRENT FLOWS THROUGH DIODE 35
AT 2A SWITCH 22a, 2A SWITCH 22a MAY BE OPEN

CHARGING CIRCUIT

CROSS-REFERENCE TO RELATED APPLICATION

This application claims priority to Japanese Patent Application No. 2023-024864 filed on Feb. 21, 2023, incorporated herein by reference in its entirety.

BACKGROUND

1. Technical Field

The disclosure relates to a charging circuit connected between a power supply and a battery and used at the time of charging the battery with electric power of the power supply.

2. Description of Related Art

With widespread use of battery electric vehicles, the number of charging stations is also increasing. Old charging stations are capable of supply only low-voltage electric power, but new charging stations are capable of supplying high-voltage electric power. An example of "low voltage" ranges from 300 volts to 600 volts, and an example of "high voltage" ranges from 600 volts to 1200 volts. The terms "low voltage" and "high voltage" relatively describes a difference between output voltages of two power supplies, and the disclosure is not limited to these voltages.

Battery electric vehicles are desirably capable of being charged with any of two-type power supplies (a low-voltage power supply and a high-voltage power supply). Japanese Unexamined Patent Application Publication No. 2019-047677 (JP 2019-047677 A) and U.S. Pat. No. 11,336,101 both describe charging circuits that support two-type power supplies. The charging circuit of JP 2019-047677 A and the charging circuit of U.S. Pat. No. 11,336,101 are mounted on battery electric vehicles (or hybrid electric vehicles). Each of the battery electric vehicles (or the hybrid electric vehicles) includes two batteries. The charging circuit is capable of charging the two batteries with any of a low-voltage power supply and a high-voltage power supply. When the low-voltage power supply is used, the charging circuit connects the two batteries in parallel with each other. When the high-voltage power supply is used, the charging circuit connects the two batteries in series with each other.

SUMMARY

The disclosure provides a charging circuit capable of charging two batteries with a single power supply. Particularly, the disclosure provides a charging circuit capable of shortening a period of time required to charge two batteries. The disclosure further provides a circuit capable of being used at the time of charging and also capable of being used at the time of supplying electric power from the batteries to an electrical device.

A first aspect of the disclosure provides a charging circuit. The charging circuit is connected between a power supply and first and second batteries. The charging circuit includes a first voltage terminal, a second voltage terminal, a third voltage terminal, a first capacitor, a second capacitor, a third capacitor, a fourth capacitor, a coil, a first switch, a second switch, a third switch, and a controller. A positive electrode of the first battery is connected to the first voltage terminal. A negative electrode of the first battery and a positive electrode of the second battery are connected to the second voltage terminal. A negative electrode of the second battery is connected to the third voltage terminal. The first capacitor is connected between the first voltage terminal and the second voltage terminal. The second capacitor is connected between the second voltage terminal and the third voltage terminal. The coil and the third capacitor are connected in series with each other. A series connection circuit of the coil and the third capacitor is simply referred to as series circuit hereinafter. The fourth capacitor is connected in parallel with the power supply. The first switch is configured to connect the series circuit between the first voltage terminal and the second voltage terminal. The second switch is configured to connect the series circuit between the second voltage terminal and the third voltage terminal. The third switch is configured to connect the series circuit to the power supply and the fourth capacitor. The controller is configured to control the first switch, the second switch, and the third switch. The controller is configured to switch a mode among the following three modes. In a first mode, the first switch is closed, and the second switch and the third switch are open. In a second mode, the second switch is closed, and the first switch and the third switch are open. In a third mode, the third switch is closed, and the first switch and the second switch are open. The controller is configured to control the first switch, the second switch, and the third switch such that the mode is repeated in order of the third mode, the first mode, the third mode, and the second mode.

A voltage of the first capacitor is equal to a voltage of the first battery, a voltage of the second capacitor is equal to a voltage of the second battery, and a voltage of the fourth capacitor is equal to a voltage of the power supply. In the third mode, the fourth capacitor and the third capacitor are connected, and a current flows from the fourth capacitor to the third capacitor. When the controller switches the mode from the third mode to the first mode, the third capacitor and the first capacitor are connected, and a current flows from the third capacitor to the first capacitor. As a result, a total voltage of the first capacitor and the second capacitor increases, and a current flows from the first capacitor and the second capacitor toward the first battery and the second battery. In other words, the first battery and the second battery are charged. The first capacitor plays a role in reducing pulsation of current flowing into the first battery and stabilizing a voltage between both ends of the first battery.

When the controller switches the mode from the first mode to the third mode, electric energy is accumulated in the series circuit again.

When the controller switches the mode from the third mode to the second mode, the third capacitor and the second capacitor are connected, and a current flows from the third capacitor to the second capacitor. As a result, a total voltage of the first capacitor and the second capacitor increases, and a current flows from the first capacitor and the second capacitor toward the first battery and the second battery. In other words, the first battery and the second battery are charged. The second capacitor plays a role in reducing pulsation of current flowing into the second battery and stabilizing a voltage between both ends of the second battery.

Each time the controller switches the mode, a current flows from the power supply to the fourth capacitor and then flows from the fourth capacitor to the first capacitor (or the second capacitor). A total voltage of the first capacitor and the second capacitor increases, and the first battery and the second battery are charged. When the charging circuit is used, a current flows to the first battery and the second battery, so it is possible to shorten a period of time required for charging.

When one battery is charged with the charging circuit, the positive electrode and negative electrode of the battery just need to be respectively connected to the first voltage terminal and the third voltage terminal. When the controller controls the three switches as described above, one battery can be charged.

The controller may be configured to control the first switch, the second switch, and the third switch such that the first mode, the second mode, and the third mode sequentially switch at time intervals of a half of a resonance period of a resonant circuit made up of the coil and the third capacitor. When the switches are controlled at the above-described timing, a current flowing through the switches is small (theoretically, zero) when the switches are switched. Therefore, when the switches are controlled at the above-described timing, it is possible to reduce switching losses.

An example of the first switch and the second switch is as follows. The first switch may be connected between the second voltage terminal and a low-voltage side of the series circuit. The second switch may be connected between a high-voltage side of the series circuit and the second voltage terminal. In this case, the following first diode and second diode just need to be provided. An anode of the first diode may be connected to the high-voltage side of the series circuit, and a cathode of the first diode may be connected to the first voltage terminal. An anode of the second diode may be connected to the third voltage terminal, and a cathode of the second diode may be connected to the low-voltage side of the series circuit. An arrangement of such switches and diodes provides a simple circuit. A specific circuit configuration will be described in embodiments.

When the following switch configuration is provided, the charging circuit can be used not only for battery charging but also for power supply from the battery to the electrical device. The first switch may include a 1A switch and a 1B switch. The second switch may include a 2A switch and a 2B switch. The 1A switch may be connected between the second voltage terminal and a low-voltage side of the series circuit. The 1B switch may be connected between a high-voltage side of the series circuit and the first voltage terminal. The 2A switch may be connected between the high-voltage side of the series circuit and the second voltage terminal. The 2B switch may be connected between the third voltage terminal and the low-voltage side of the series circuit. The charging circuit, as in the case of the above-described charging circuit, is capable of charging the batteries. An electrical device is connected instead of the power supply. When the first mode, the second mode, and the third mode are switched as described above, the charging circuit can supply electric power from the batteries to the electrical device.

In the above configuration, the charging circuit further may include a first diode of which an anode is connected to the high-voltage side of the series circuit and a cathode is connected to the first voltage terminal; and a second diode of which an anode is connected to the third voltage terminal and a cathode is connected to the low-voltage side of the series circuit. The 1B switch may be connected in parallel with the first diode, and the 2B switch may be connected in parallel with the second diode.

In the above configuration, the third switch may include a 3A switch connected between the high-voltage side and a positive electrode input terminal of the charging circuit and a 3B switch connected between the low-voltage side and a negative electrode input terminal of the charging circuit.

Details and further improvements of the aspect of the disclosure will be described below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
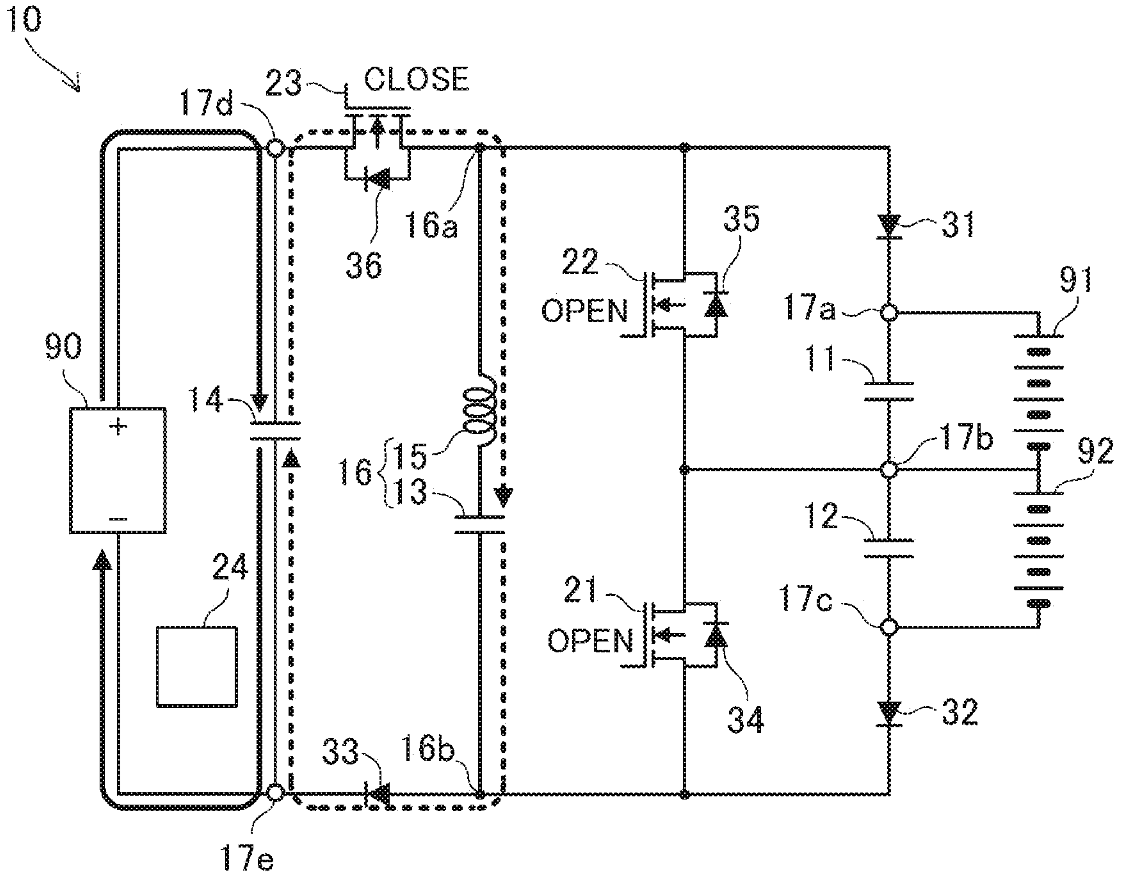
FIG. 1 is a circuit diagram of a charging circuit (third mode) according to a first embodiment.

A charging circuit 10 according to a first embodiment will be described with reference to the accompanying drawings. FIG. 1 is a circuit diagram of the charging circuit 10. The charging circuit 10 is connected between a direct-current power supply 90 and two batteries (a first battery 91 and a second battery 92). The charging circuit 10 is capable of charging the two batteries 91, 92 with electric power of the direct-current power supply 90. The two batteries 91, 92 are mounted on, for example, a battery electric vehicle. The direct-current power supply 90 is provided in, for example, a charging station. The charging circuit 10 may be provided in a charging station or may be provided in a battery electric vehicle.

A circuit configuration of the charging circuit 10 will be described. The charging circuit 10 includes two input terminals 17*d*, 17*e* and three output terminals 17*a*, 17*b*, 17*c*. A positive electrode of the direct-current power supply 90 is connected to the positive electrode input terminal 17*d*, and a negative electrode of the direct-current power supply 90 is connected to the negative electrode input terminal 17*e*.

The three output terminals 17*a*, 17*b*, 17*c* are respectively referred to as the high-voltage terminal 17*a*, the intermediate-voltage terminal 17*b*, and the low-voltage terminal 17*c*. The first battery 91 is connected between the high-voltage terminal 17*a* and the intermediate-voltage terminal 17*b*. A positive electrode of the first battery 91 is connected to the high-voltage terminal 17*a*, and a negative electrode of the first battery 91 is connected to the intermediate-voltage terminal 17*b*. The second battery 92 is connected between the intermediate-voltage terminal 17*b* and the low-voltage terminal 17*c*. A positive electrode of the second battery 92 is connected to the intermediate-voltage terminal 17*b*, and a negative electrode of the second battery 92 is connected to the low-voltage terminal 17*c*.

The charging circuit 10 includes four capacitors (a first capacitor 11, a second capacitor 12, a third capacitor 13, and a fourth capacitor 14). The first capacitor 11 is connected between the high-voltage terminal 17*a* and the intermediate-voltage terminal 17*b*. The second capacitor 12 is connected between the intermediate-voltage terminal 17*b* and the low-voltage terminal 17*c*. The first capacitor 11 and the second capacitor 12 are connected in series with each other.

The third capacitor 13 is connected in series with a coil 15. A series connection circuit made up of the third capacitor 13 and the coil 15 is referred to as a series circuit 16 for the sake of convenience. The series circuit 16 is connected between the high-voltage terminal 17*a* and the low-voltage terminal 17*c* via switches. The series circuit 16 is also connected between the input terminals 17*d*, 17*e* via another switch.

The fourth capacitor 14 is connected between the positive electrode input terminal 17*d* and the negative electrode input terminal 17*e*. In other words, the fourth capacitor 14 is connected in parallel with the power supply 90. In other words, the fourth capacitor 14 is connected in parallel with the series circuit 16. However, a third switch 23 is connected between the fourth capacitor 14 and the series circuit 16. Next, the switches will be described.

The charging circuit 10 includes three switches (a first switch 21, a second switch 22, and the third switch 23). The first switch 21 is connected between the intermediate-voltage terminal 17*b* and a low-voltage side 16*b* of the series circuit 16. The second switch 22 is connected between a high-voltage side 16*a* of the series circuit 16 and the intermediate-voltage terminal 17*b*. The third switch 23 is connected between the positive electrode input terminal 17*d* and the high-voltage side 16*a*. A diode 34 that prevents backflow is connected to the switch 21. A diode 35 that prevents backflow is connected to the switch 22. A diode 36 that prevents backflow is connected to the switch 23.

The charging circuit 10 includes three diodes (a first diode 31, a second diode 32, and a third diode 33). The first diode 31 is connected between the high-voltage side 16*a* and the high-voltage terminal 17*a*. An anode of the first diode 31 is connected to the high-voltage side 16*a*, and a cathode of the first diode 31 is connected to the high-voltage terminal 17*a*.

The second diode 32 is connected between the low-voltage terminal 17*c* and the low-voltage side 16*b*. An anode of the second diode 32 is connected to the low-voltage terminal 17*c*, and a cathode of the second diode 32 is connected to the low-voltage side 16*b*. The third diode 33 is connected between the low-voltage side 16*b* and the negative electrode input terminal 17*e*. An anode of the third diode 33 is connected to the low-voltage side 16*b*, and a cathode of the third diode 33 is connected to the negative electrode input terminal 17*e*. The diodes 31, 32, 33 are provided so as to prevent backflow of current.

The switches 21, 22, 23 are controlled by the controller 24. In other words, the controller 24 opens and closes each of the switches 21, 22, 23. Here, the phrase "closing the switch" means connecting both ends of the switch, and the phrase "opening the switch" means disconnecting one end of the switch from the other end. Since the switches 21, 22, 23 are semiconductor switches, "closing the switch" may be expressed by "turning on the switch", and "opening the switch" may be expressed by "turning off the switch".

When the first switch 21 is closed, the series circuit 16 is connected to the first capacitor 11. When the first switch 21 is opened, the series circuit 16 is disconnected from the first capacitor 11.

When the second switch 22 is closed, the series circuit 16 is connected to the second capacitor 12. When the second switch 22 is opened, the series circuit 16 is disconnected from the second capacitor 12. Since the second battery 92 is connected to both ends of the second capacitor 12, the series circuit 16 is connected to the second battery 92 when the second switch 22 is closed, and the series circuit 16 is disconnected from the second battery 92 when the second switch 22 is open.

When the third switch 23 is closed, the series circuit 16 is connected to the power supply 90 (and the fourth capacitor 14). When the third switch 23 is open, the series circuit 16 is disconnected from the power supply 90 (and the fourth capacitor 14).

The controller 24 controls the switches 21, 22, 23. The controller 24 closes the third switch 23 and opens the first switch 21 and the second switch 22. The state at this time is referred to as third mode. The statuses of the switches in the third mode are shown at the bottom of FIG. 1. In the table, symbols SW1, SW2, SW3 respectively denote the first switch 21, the second switch 22, and the third switch 23.

The controller 24 closes the first switch 21 and opens the second switch 22 and the third switch 23. The state at this time is referred to as first mode. The controller 24 closes the second switch 22 and opens the first switch 21 and the third switch 23. The state at this time is referred to as second mode. The controller 24 controls the switches 21, 22, 23 to implement any one of the first mode, the second mode, and the third mode. The controller 24 controls the switches 21, 22, 23 such that a mode is repeated in order of the third mode, the first mode, the third mode, and the second mode. When the switches 21, 22, 23 are switched in this way, a current flows through the first capacitor 11 and the second capacitor 12. The first capacitor 11 and the second capacitor 12 are connected in series with each other, so a total voltage of the first capacitor 11 and the second capacitor 12 increases. As a result, a current flows from the first capacitor 11 and the second capacitor 12 to the first battery 91 and the second battery 92, and these batteries are charged.

Flow of current in each mode will be described. The wide arrow lines (the continuous arrow line and the dashed arrow line) in FIG. 1 show the flow of current in the third mode. The wide continuous arrow line represents the path of direct current, and the wide dashed arrow line represents the path through which a sinusoidal-wave current flows. A sinusoidal-wave current is generated as a result of resonation of the series circuit 16 (an LC resonant circuit made up of the coil 15 and the third capacitor 13).

The controller 24 closes the third switch 23 and opens the first switch 21 and the second switch 22. In the third mode, the series circuit 16 is connected to the direct-current power supply 90 and the fourth capacitor 14 through the third switch 23 and the third diode 33. Since the first switch 21 and the second switch 22 are open, the series circuit 16 is disconnected from the first capacitor 11 and the second capacitor 12. The direct-current power supply 90 and the fourth capacitor 14 are connected in parallel with each other, and a direct current flows from the direct-current power supply 90 to the fourth capacitor 14. The fourth capacitor 14 is charged.

As the third switch 23 is closed, a current begins to flow from the fourth capacitor 14 to the series circuit 16. Since the series circuit 16 is an LC resonant circuit, a current flowing from the fourth capacitor 14 to the series circuit 16 gradually increases. When the third capacitor 13 of the series circuit 16 is charged, a current flowing from the fourth capacitor 14 to the series circuit 16 gradually reduces. In this way, a sinusoidal-wave current flows from the fourth capacitor 14 to the series circuit 16.

Figure 2:
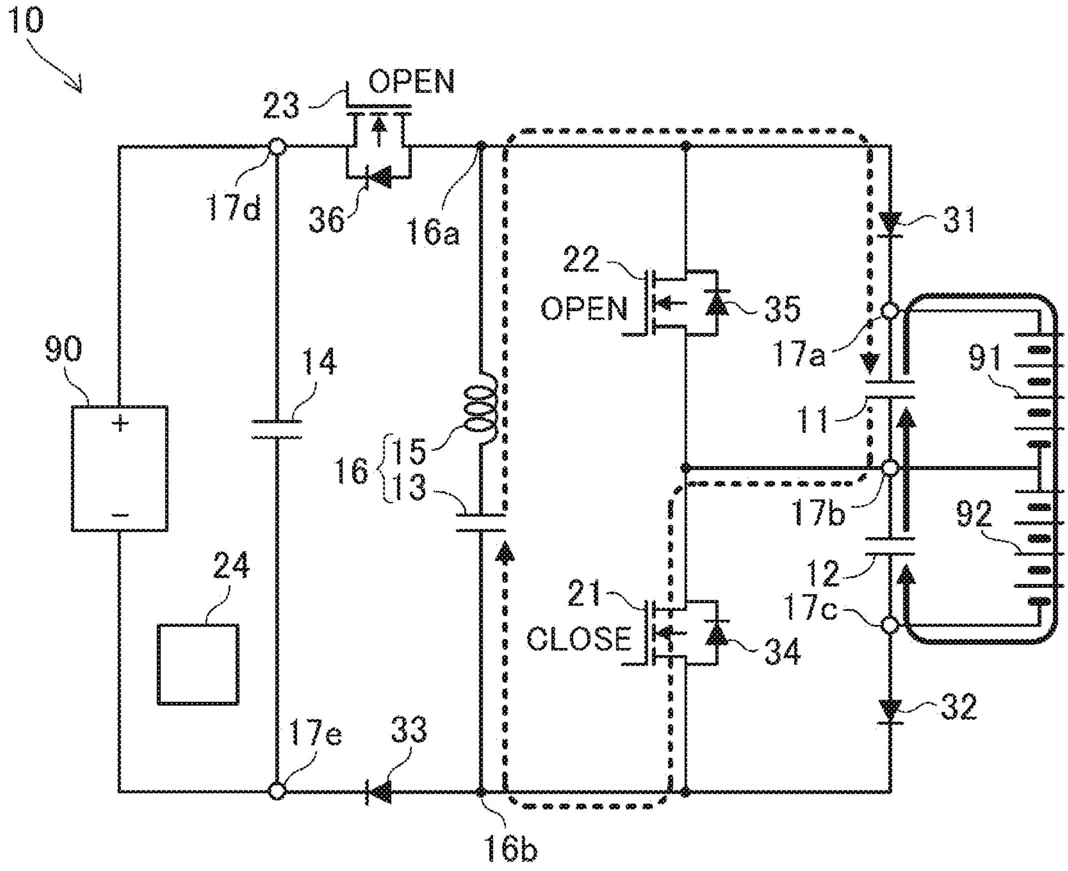
FIG. 2 is a circuit diagram of the charging circuit (first mode)

FIG. 2 shows the flow of current in the first mode. The wide arrow line (the continuous arrow line and the dashed arrow line) in FIG. 2 represent the flow of current in the first mode. In FIG. 2 as well, the wide continuous arrow line represents the path of direct current, and the wide dashed arrow line represents the path through which a sinusoidal-wave current flows. Similarly in the following circuit diagrams, the wide continuous arrow line represents the path of direct current, and the wide dashed arrow line represents the path through which a sinusoidal-wave current flows. In any of the circuit diagrams, a sinusoidal-wave current is generated as a result of resonation of the series circuit 16 (the LC resonant circuit made up of the coil 15 and the third capacitor 13).

In the first mode, the controller 24 closes the first switch 21 and opens the second switch 22 and the third switch 23. In the first mode, the series circuit 16 is connected to the first capacitor 11 through the first switch 21 and the first diode 31. When the second switch 22 and the third switch 23 are open, the series circuit 16 is disconnected from the direct-current power supply 90, the fourth capacitor 14, and the second capacitor 12.

The controller 24 controls the switches 21, 22, 23 to switch the mode from the third mode to the first mode. Just before switching the mode to the first mode, electric energy is accumulated in the third capacitor 13. In the first mode, the direct-current power supply 90 and the fourth capacitor 14 are isolated from the series circuit 16. On the other hand, as the first switch 21 is closed, a current begins to flow from the series circuit 16 to the first capacitor 11. Since the series circuit 16 is an LC resonant circuit, a current flowing from the series circuit 16 to the first capacitor 11 gradually increases. When the third capacitor 13 of the series circuit 16 is discharged, a current flowing from the series circuit 16 to the first capacitor 11 gradually reduces. In this way, a sinusoidal-wave current flows from the series circuit 16 to the first capacitor 11.

As the voltage between both ends of the first capacitor 11 increases, a total voltage of the first capacitor 11 and the second capacitor 12 increases. As a result, a current flows from a series connection circuit made up of the first capacitor 11 and the second capacitor 12 to a series connection circuit made up of the first battery 91 and the second battery 92. In other words, the first battery 91 and the second battery 92 are charged.

The controller 24 switches the mode from the first mode to the third mode. The series circuit 16 is connected to the direct-current power supply 90 again, and the series circuit 16 is disconnected from the first capacitor 11 and the second capacitor 12. Electric energy is accumulated again in the third capacitor 13 discharged in the first mode.

Figure 3:
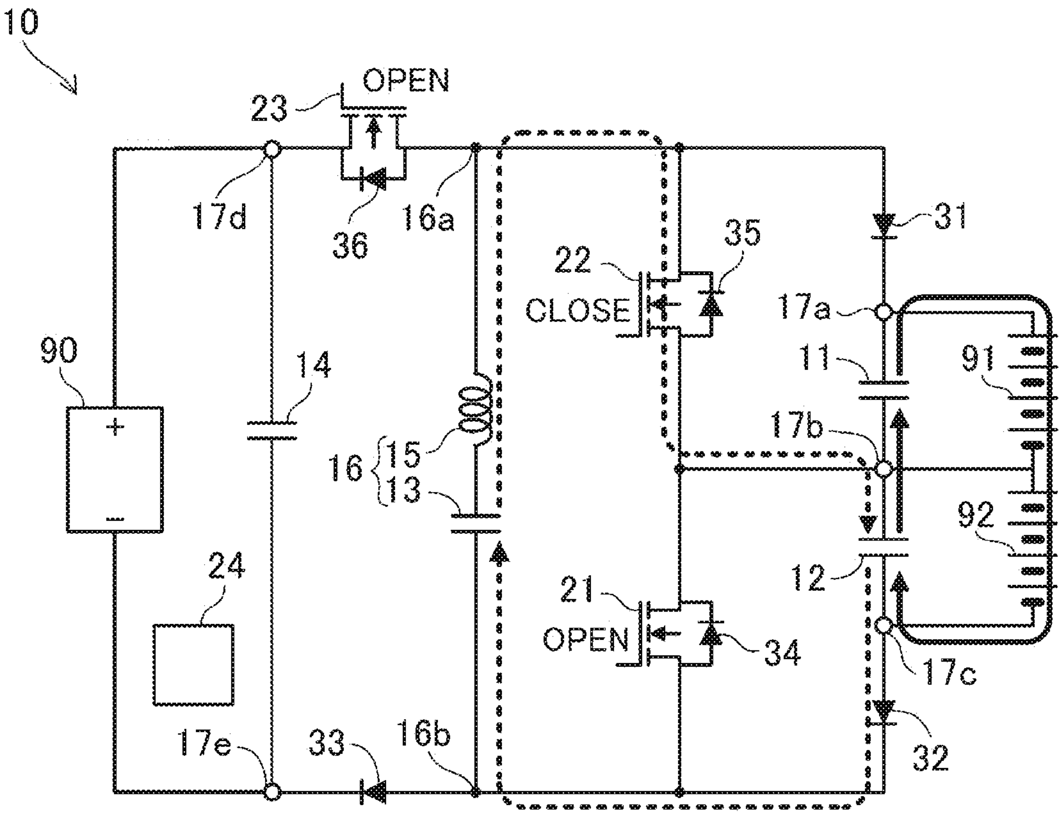
FIG. 3 is a circuit diagram of the charging circuit (second mode)

Subsequently, the controller 24 switches the mode from the third mode to the second mode. FIG. 3 shows the flow of current in the second mode. The wide arrow lines in FIG. 3 represent the flow of current in the second mode. The continuous arrow line represents the path of direct current, and the dashed arrow line represents the path of sinusoidal-wave current. In the second mode, the controller 24 closes the second switch 22 and opens the first switch 21 and the third switch 23. In the second mode, the series circuit 16 is connected to the second capacitor 12 through the second switch 22 and the second diode 32. When the first switch 21 and the third switch 23 are open, the series circuit 16 is disconnected from the direct-current power supply 90, the fourth capacitor 14, and the first capacitor 11.

Just before switching the mode to the second mode, electric energy is accumulated in the third capacitor 13. In the second mode, the direct-current power supply 90 and the fourth capacitor 14 are isolated from the series circuit 16. On the other hand, as the second switch 22 is closed, a current begins to flow from the series circuit 16 to the second capacitor 12. Due to the same reason as that in the first mode, a sinusoidal-wave current flows from the series circuit 16 to the second capacitor 12. As the voltage between both ends of the second capacitor 12 increases, a total voltage of the first capacitor 11 and the second capacitor 12 increases. As a result, a current flows from the series connection circuit made up of the first capacitor 11 and the second capacitor 12 to the series connection circuit made up of the first battery 91 and the second battery 92. In other words, the first battery 91 and the second battery 92 are charged.

The controller 24 switches the mode from the second mode to the third mode. The series circuit 16 is connected to the direct-current power supply 90 and the fourth capacitor 14 again, and the series circuit 16 is disconnected from the first capacitor 11 and the second capacitor 12. Electric energy is accumulated again in the third capacitor 13 discharged in the second mode.

The controller 24 repetitively switches the mode in order of the third mode, the first mode, the third mode, and the second mode. Each time the controller 24 switches the mode from the third mode to the first mode or the second mode, the first battery 91 and the second battery 92 are charged little by little. Each time the controller 24 repeats a cycle of the third mode, the first mode, the third mode, and the second mode, the first battery 91 and the second battery 92 are charged little by little.

A preferred time interval of mode switching will be described. The charging circuit 10 includes a resonant circuit made up of the third capacitor 13 and the coil 15. The capacitance of the third capacitor 13 is denoted by symbol "C", and the reactance of the coil 15 is denoted by symbol "L". A resonance frequency fr of the resonant circuit is expressed by fr=1/(2×PAI×Root(LC)). Here, "PAI" denotes a circular constant, and Root(X) denotes the square root of X. A resonance period Tr is an inverse number of the resonance frequency and is expressed by Tr=1/fr=2×PAI×Root(LC).

The controller 24 controls the switches 21, 22, 23 such that the mode switches at time intervals (=Tr/2) corresponding to a half of the period (resonance period) of the resonant circuit made up of the coil 15 and the third capacitor 13. The advantage of this process will be described with reference to FIG. 4 and FIG. 5. Hereinafter, the time interval (=Tr/2) corresponding to a half of the period (resonance period) of the resonant circuit may be referred to as resonance half period (Tr/2). Hereinafter, for the sake of easy description, the influence of the capacitors 11, 12, 14 is ignored.

Figure 4:
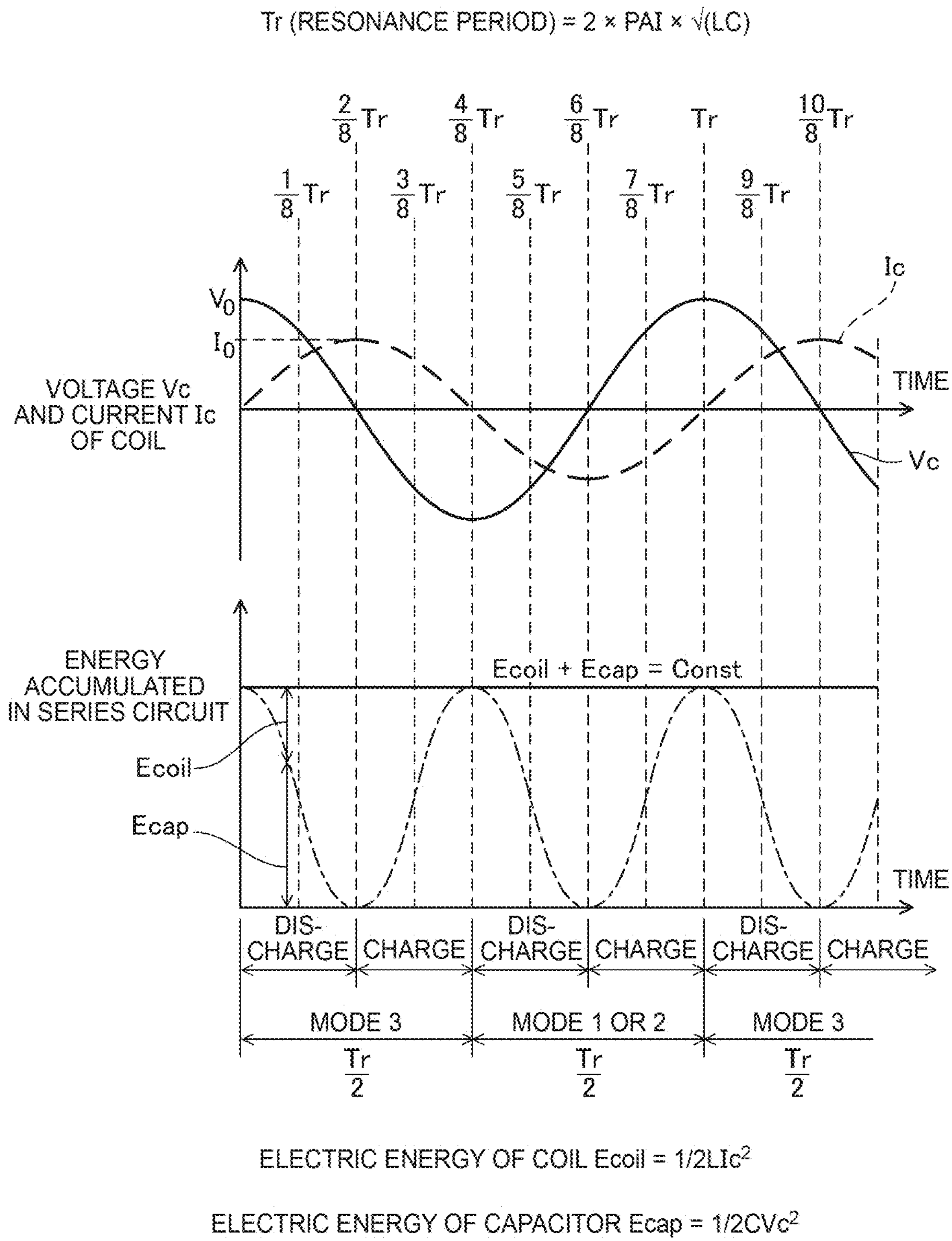
FIG. 4 is a graph of a voltage and a current of a coil when switches are switched and is a graph of electric energy accumulated in a series circuit.

FIG. 4 is a timing chart before and after the mode is switched from the third mode to the first mode (second mode). The top graph represents a voltage Vc between both ends of the coil 15 and a current Ic flowing through the coil 15. The bottom graph is a graph of electric energy accumulated in the series circuit 16 (that is, the coil 15 and the third capacitor 13). Due to the influence of the reactance L of the coil 15, there is a phase difference of Tr/4 between a current change and a voltage change of the coil 15. A positive value of the graph of current Ic represents a current heading from the coil 15 toward the third capacitor 13.

The third mode is set from time zero to time Tr/2, and the first mode (or the second mode) is set from time Tr/2 to time Tr. The mode switches from the first mode (or the second mode) to the third mode at time zero. A current Ic flows from the fourth capacitor 14 toward the third capacitor 13 (series circuit 16). Due to the influence of the reactance L of the coil 15, a current Ic flowing into the third capacitor 13 forms a sinusoidal wave. The current Ic is zero at time Tr/2. At this time, energy Ecap accumulated in the third capacitor 13 is maximum. At this time, energy Ecoil accumulated in the coil 15 is minimum. As is well known, when a series circuit of a coil and a capacitor is in a resonant state, the sum of energy Ecoil of the coil and energy Ecap of the capacitor is always constant. The energy Ecap of the capacitor is maximum at time zero and time Tr/2. The voltage between both ends of the third capacitor 13 is minimum at time zero. The voltage between both ends of the third capacitor 13 is maximum at time Tr/2.

The mode switches from the third mode to the first mode (or the second mode) at time Tr/2. Now, the current Ic flows from the third capacitor 13 to the first capacitor 11 (or the second capacitor 12). At this time as well, due to the influence of the reactance L of the coil 15, a current Ic flowing out from the third capacitor 13 forms a sinusoidal wave. The current Ic is zero at time Tr. At this time, energy Ecap accumulated in the third capacitor 13 is maximum. At time Tr, as in the case of time zero, the voltage between both ends of the third capacitor 13 is minimum.

The time at which energy Ecap accumulated in the third capacitor 13 is maximum is the time when the voltage between both ends of the third capacitor 13 is maximum or minimum. Therefore, a period of change in energy Ecap is a half of a period of change in the voltage between both ends of the third capacitor 13 (that is, a period of change in the voltage Vc of the coil 15). In other words, in one period of change in the voltage between both ends of the third capacitor 13 (that is, one period of change in the voltage Vc of the coil 15), a step in which electric energy is accumulated such that the voltage between both ends of the third capacitor 13 is maximum and a step in which electric energy is accumulated such that the voltage between both ends of the third capacitor 13 is minimum are performed.

In this way, when the mode is switched at the resonance half period (Tr/2), the third capacitor 13 repeats charging and discharging. During charging, the current Ic flows from the fourth capacitor 14 to the third capacitor 13. During discharging, the current Ic flows from the third capacitor 13 to the first capacitor 11 (or the second capacitor 12).

Figure 5:
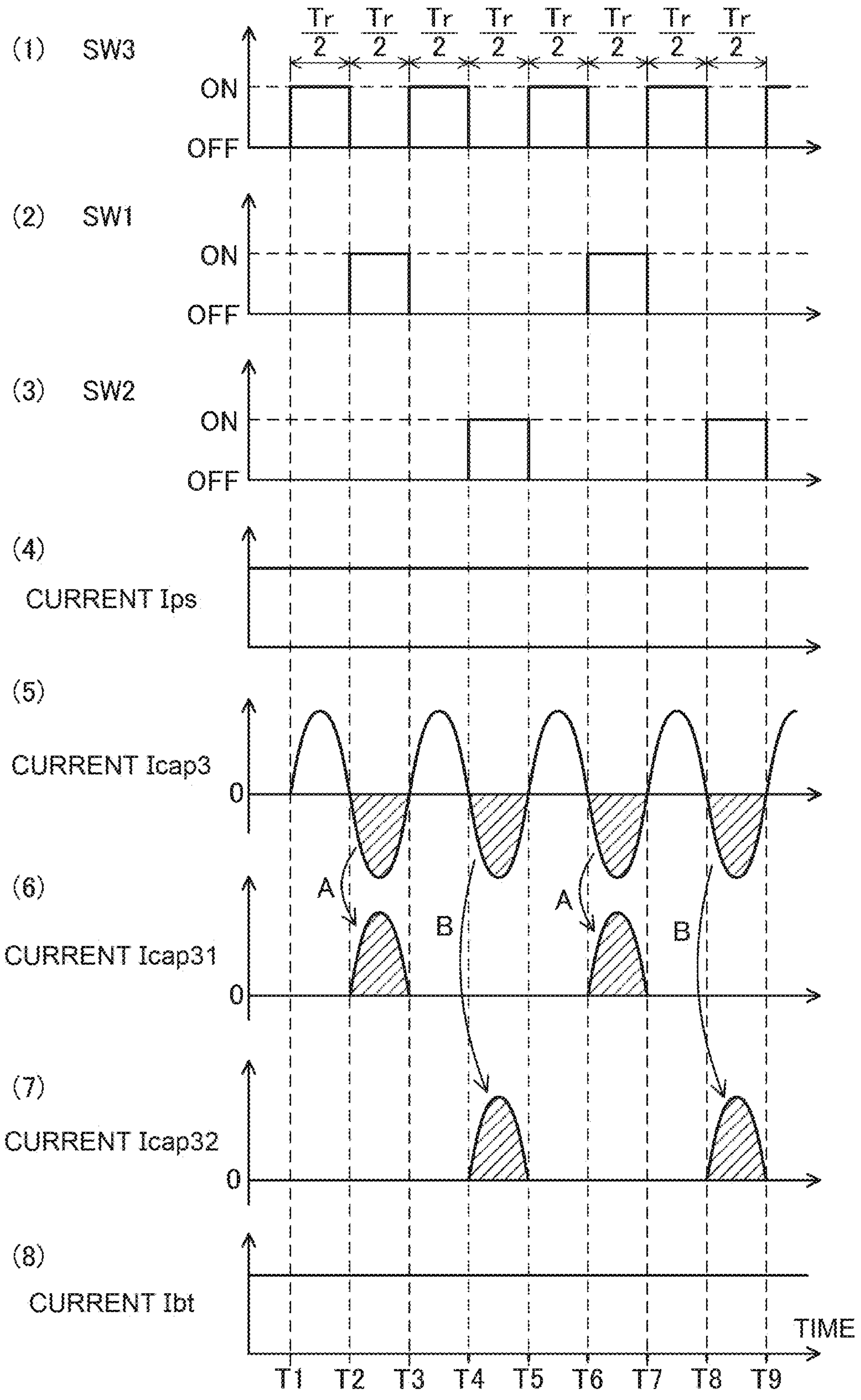
FIG. 5 shows timing charts of statuses of the switches and flows of currents.

FIG. 5 shows timing charts of the statuses of the switches and currents when the switches are sequentially switched. In FIG. 5, symbols "SW1", "SW2", and "SW3" respectively denote the first switch 21, the second switch 22, and the third switch 23. A timing chart (1) in FIG. 5 is a timing chart of the operation of SW3 (third switch 23). A timing chart (2) in FIG. 5 is a timing chart of the operation of SW1 (first switch 21). A timing chart (3) in FIG. 5 is a timing chart of the operation of SW2 (second switch 22). The switches 21, 22, 23 are semiconductor switches. In FIG. 5, "ON" means that the switch is closed, and "OFF" means that the switch is open.

A timing chart (4) in FIG. 5 is a timing chart of current Ips flowing out from the direct-current power supply 90. A timing chart (5) in FIG. 5 is a timing chart of current Icap3 flowing through the third capacitor 13. In the timing chart (5) in FIG. 5 as well, a positive value represents a current flowing into the third capacitor 13, a negative value represents a current flowing out from the third capacitor 13.

Figure 6A:
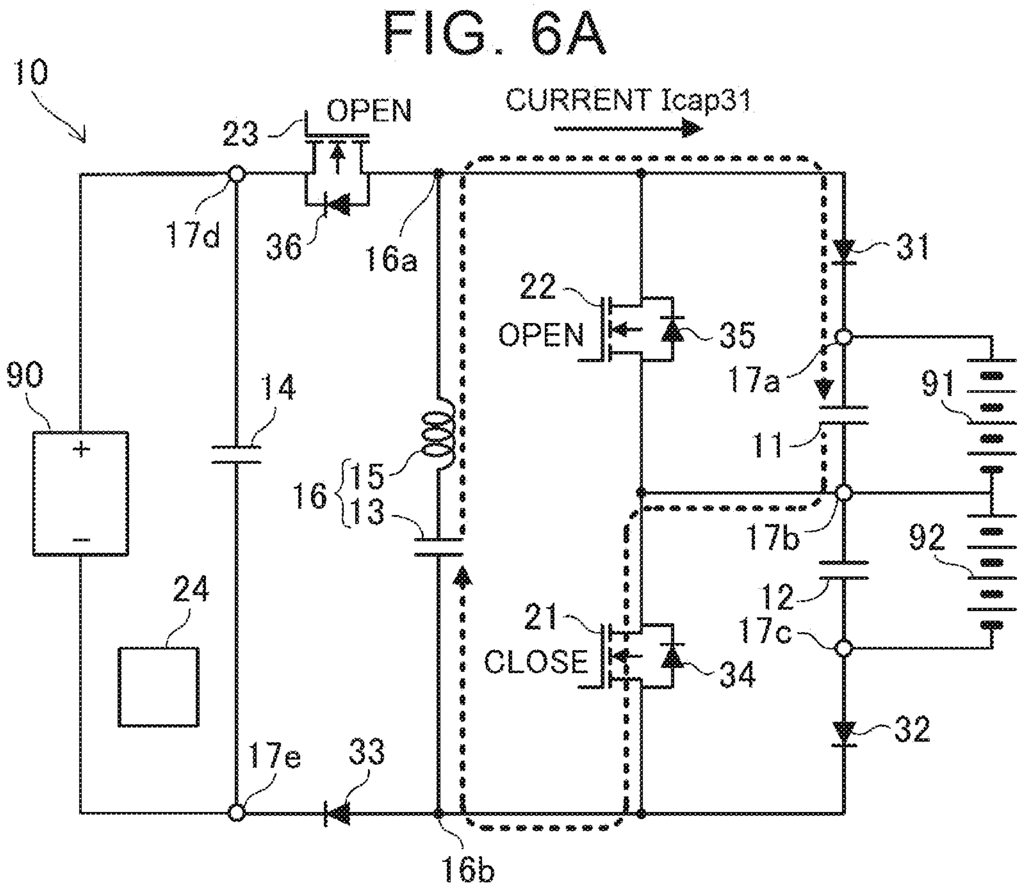
FIG. 6A is a diagram that shows a path of current Icap31.
Figure 6B:
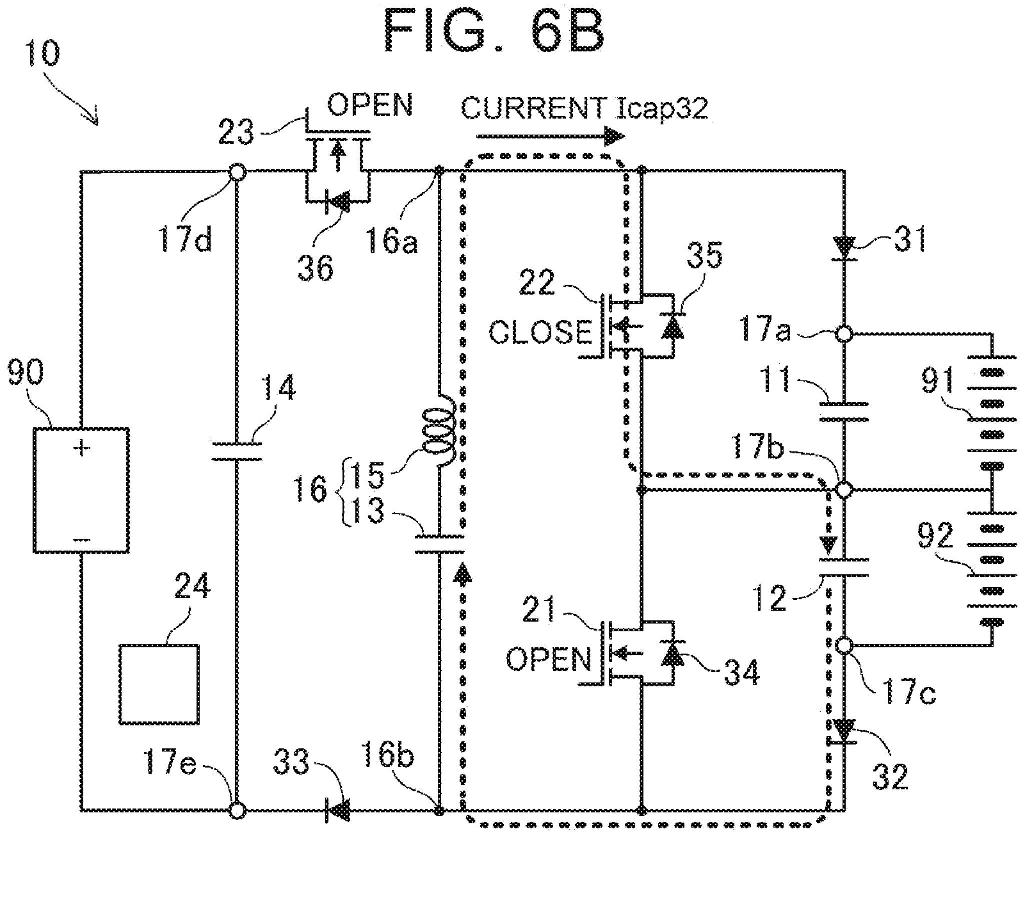
FIG. 6B is a diagram that shows a path of current Icap32.

A timing chart (6) in FIG. 5 is a timing chart of current Icap31 flowing from the third capacitor 13 toward the first capacitor 11. A timing chart (7) in FIG. 5 is a timing chart of current Icap32 flowing from the third capacitor 13 toward the second capacitor 12. FIG. 6A shows a path of the current Icap31. FIG. 6B shows a path of the current Icap32. The current Icap31 flows from the third capacitor 13 to the first capacitor 11 through the coil 15 and the diode 31. The current Icap31 further returns from the first capacitor 11 to the third capacitor 13 through the intermediate-voltage terminal 17*b* and the first switch 21. The current Icap32 flows from the third capacitor 13 to the second capacitor 12 through the coil 15, the second switch 22, and the intermediate-voltage terminal 17*b*. The current Icap32 further returns from the second capacitor 12 to the third capacitor 13 through the low-voltage terminal 17*c* and the diode 32.

A timing chart (8) in FIG. 5 is a timing chart of current Ibt flowing into the batteries (the first battery 91 and the second battery 92).

During the period from time T1 to time T2, the controller 24 closes the third switch 23 and opens the first switch 21 and the second switch 22. A current flows from the fourth capacitor 14 to the third capacitor 13. As described with reference to FIG. 4, electric energy is accumulated in the third capacitor 13 during this time. An interval from time T1 to time T2 corresponds to the resonance half period (Tr/2). A current flows through the resonant circuit becomes zero at every resonance half period. Since a period of time from time T1 to time T2 corresponds to the resonance half period (Tr/2), a current flowing through the third capacitor 13 is zero at time T1 and time T2.

The controller 24 controls the switches 21, 22, 23 at time T2 to switch the mode from the third mode to the first mode. At time T2, the controller 24 closes SW1 (first switch 21) and opens SW2 (second switch 22) and SW3 (third switch 23). During a period from time T2 to time T3, a current flows from the third capacitor 13 to the first capacitor 11. The portions indicated by the arrows A in FIG. 5 represent that a current flows from the third capacitor 13 to the first capacitor 11. Since the time interval between time T2 and time T3 is also the resonance half period (Tr/2), a current is also zero at time T3.

During a period from time T2 to time T3, a total voltage of the first capacitor 11 and the second capacitor 12 increases. Therefore, a current flows from the series connection circuit made up of the first capacitor 11 and the second capacitor 12 to the series connection circuit made up of the first battery 91 and the second battery 92. In other words, the first battery 91 and the second battery 92 are charged. The timing chart (8) in FIG. 5 is a timing chart of current flowing into the first battery 91 and the second battery 92. A constant current flows into the first battery 91 and the second battery 92.

The controller 24 controls the switches 21, 22, 23 at time T3 to switch the mode from the first mode to the third mode. In the third mode, the third capacitor 13 is charged again. The controller 24 controls the switches 21, 22, 23 at time T4 to switch the mode from the third mode to the second mode. During a period from time T4 to time T5, a current flows from the third capacitor 13 to the second capacitor 12. The portions indicated by the arrows B in FIG. 5 represent that a current flows from the third capacitor 13 to the second capacitor 12. Since the time interval between time T4 and time T5 also corresponds to the resonance half period (Tr/2), a current is also zero at time T4 and time T5. A similar mode switching sequence is repeated after time T5.

The controller 24 constantly switches the switches 21, 22, 23 at time intervals of the resonance half period (Tr/2). As shown in the graphs of FIG. 4 and FIG. 5, a current flowing through each switch is substantially zero at the switching timing of the switches. Since the switches are switched at the time when the current is zero, switching losses of electric power reduce. The charging circuit 10 is capable of reducing switching losses by switching the switches 21, 22, 23 at intervals of the resonance half period (Tr/2).

FIG. 1 to FIG. 3 illustrate a case where the charging circuit 10 charges two batteries (the first battery 91 and the second battery 92) at the same time. The charging circuit 10 is also capable of charging only one battery. The controller 24 is capable of charging one battery in the same mode switching sequence as in the case of charging two batteries. Here, a mode switching sequence means that the controller 24 controls the switches 21, 22, 23 such that the mode switches in order of the third mode, the first mode, the third mode, and the second mode.

Figure 7:
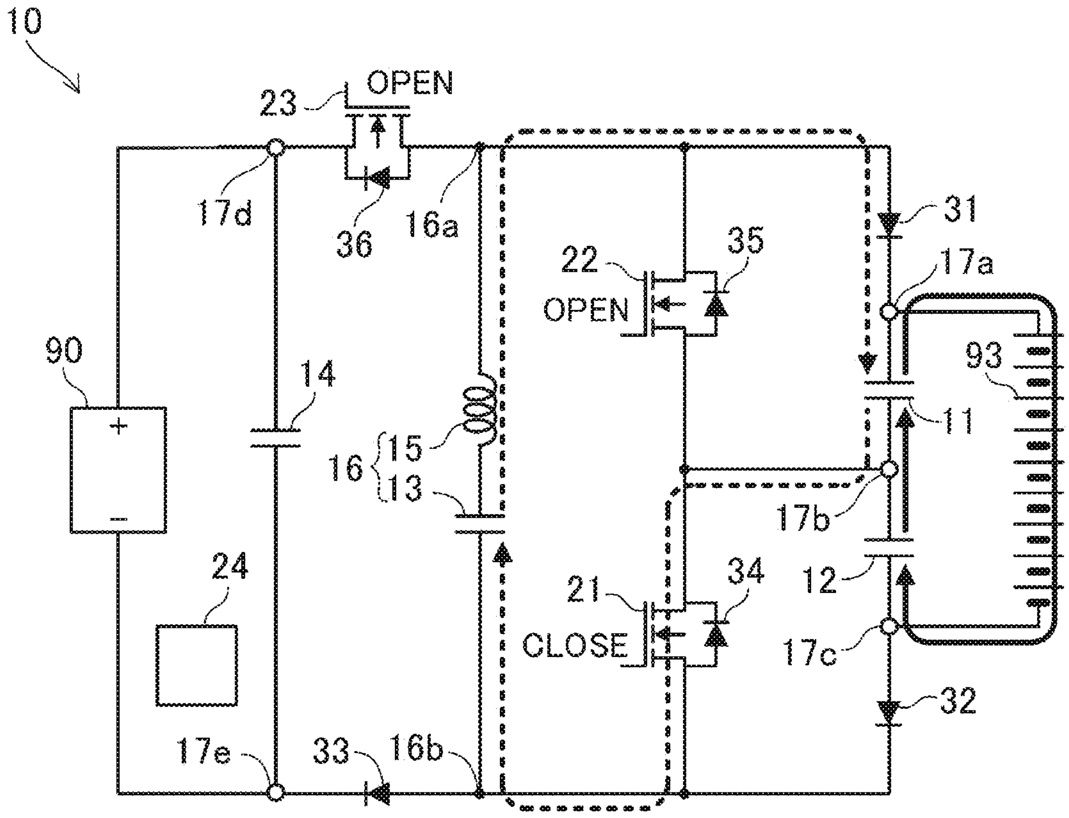
FIG. 7 is a circuit diagram of the charging circuit (one battery is charged in the first mode)
Figure 8:
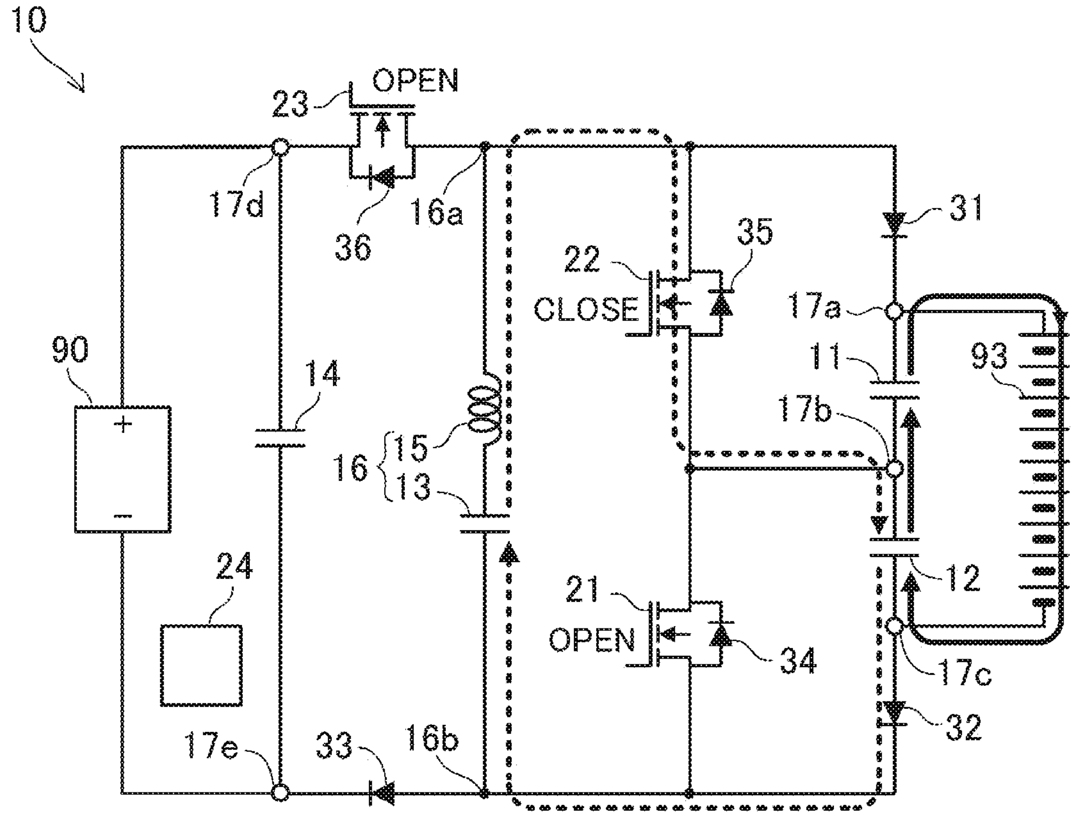
FIG. 8 is a circuit diagram of the charging circuit (one battery is charged in the second mode)

A case where one battery (third battery 93) is charged will be described with reference to FIG. 7 and FIG. 8. The third battery 93 is connected between the high-voltage terminal 17*a* and the low-voltage terminal 17*c*. A positive electrode of the third battery 93 is connected to the high-voltage terminal 17*a*, and a negative electrode of the third battery 93 is connected to the low-voltage terminal 17*c*.

The third mode has been already described with reference to FIG. 1. The controller 24 switches the mode from the third mode to the first mode. In the first mode, the controller 24 closes the first switch 21 and opens the second switch 22 and the third switch 23. The wide arrow lines in FIG. 7 represent the flow of current in the first mode. The wide continuous arrow line represents the path of direct current, and the wide dashed arrow line represents the path through which a sinusoidal-wave current flows. A sinusoidal-wave current is generated as a result of resonation of the series circuit 16 (the LC resonant circuit made up of the coil 15 and the third capacitor 13).

A current flows from the series circuit 16 into the first capacitor 11 through the first diode 31 and the high-voltage terminal 17*a*. A negative electrode of the first capacitor 11 is continuous with the series circuit 16 through the intermediate-voltage terminal 17*b* and the first switch 21. A total voltage of the first capacitor 11 and the second capacitor 12 increases. A current flows from the series circuit made up of the first capacitor 11 and the second capacitor 12 to the third battery 93. In other words, the third battery 93 is charged.

The controller 24 controls the switches 21, 22, 23 to switch the mode from the first mode to the third mode. The third mode has been described with reference to FIG. 1. In the third mode, the third capacitor 13 is charged. Subsequently, the controller 24 controls the switches 21, 22, 23 to switch the mode from the third mode to the second mode. In the second mode, the controller 24 closes the second switch 22 and opens the first switch 21 and the third switch 23. The wide arrow lines in FIG. 8 represent the flow of current in the second mode. In FIG. 8 as well, the wide continuous arrow line represents the path of direct current, and the wide dashed arrow line represents the path through which a sinusoidal-wave current flows. A sinusoidal-wave current is generated as a result of resonation of the series circuit 16 (the LC resonant circuit made up of the coil 15 and the third capacitor 13).

A current flows from the third capacitor 13 into the second capacitor 12 through the second switch 22 and the intermediate-voltage terminal 17*b*. A negative electrode of the second capacitor 12 is continuous with the third capacitor 13 through the low-voltage terminal 17*c* and the second diode 32. A total voltage of the first capacitor 11 and the second capacitor 12 increases. A current flows from the series circuit made up of the first capacitor 11 and the second capacitor 12 to the third battery 93. In the second mode as well, the third battery 93 is charged.

In this way, the charging circuit 10 is capable of charging one battery in the same mode switching sequence as in the case of charging two batteries.

Second Embodiment

Figure 9:
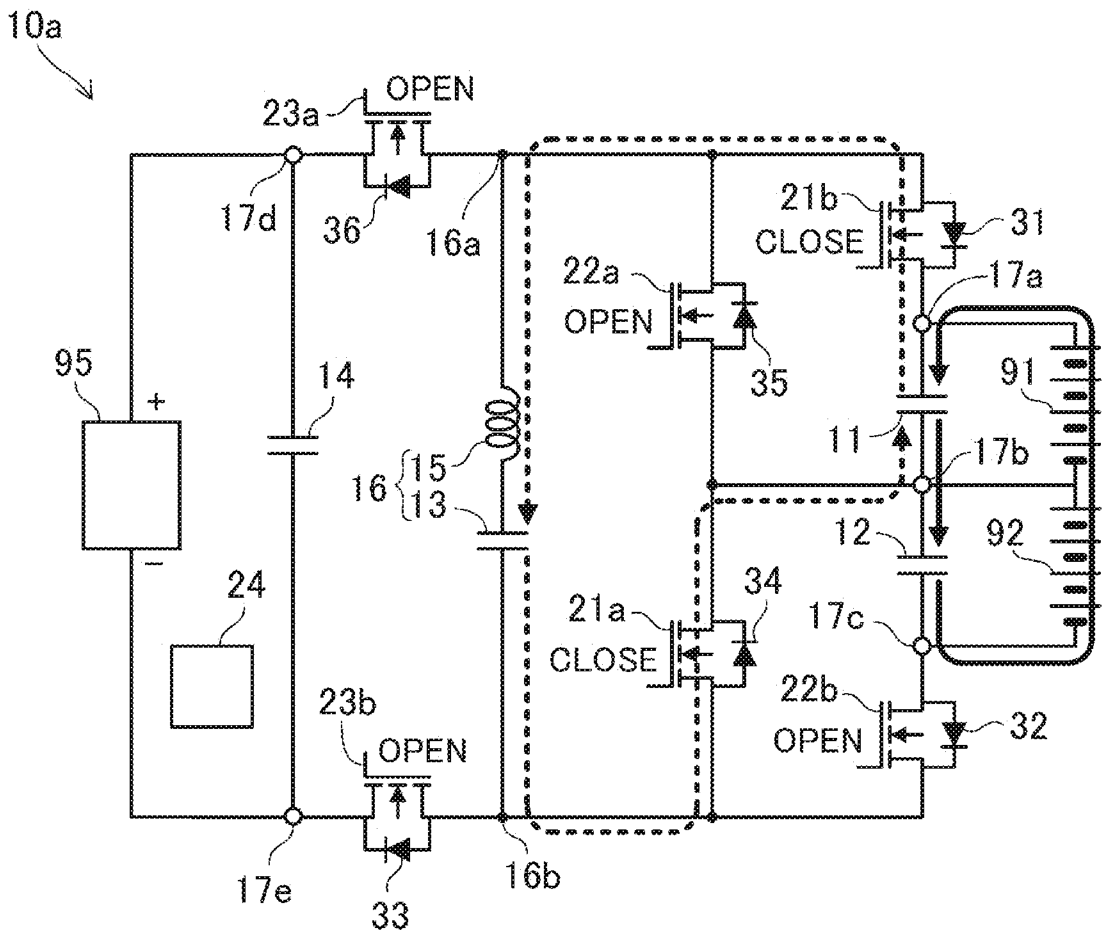
FIG. 9 is a circuit diagram of a charging circuit (first mode) according to a second embodiment.
Figure 10:
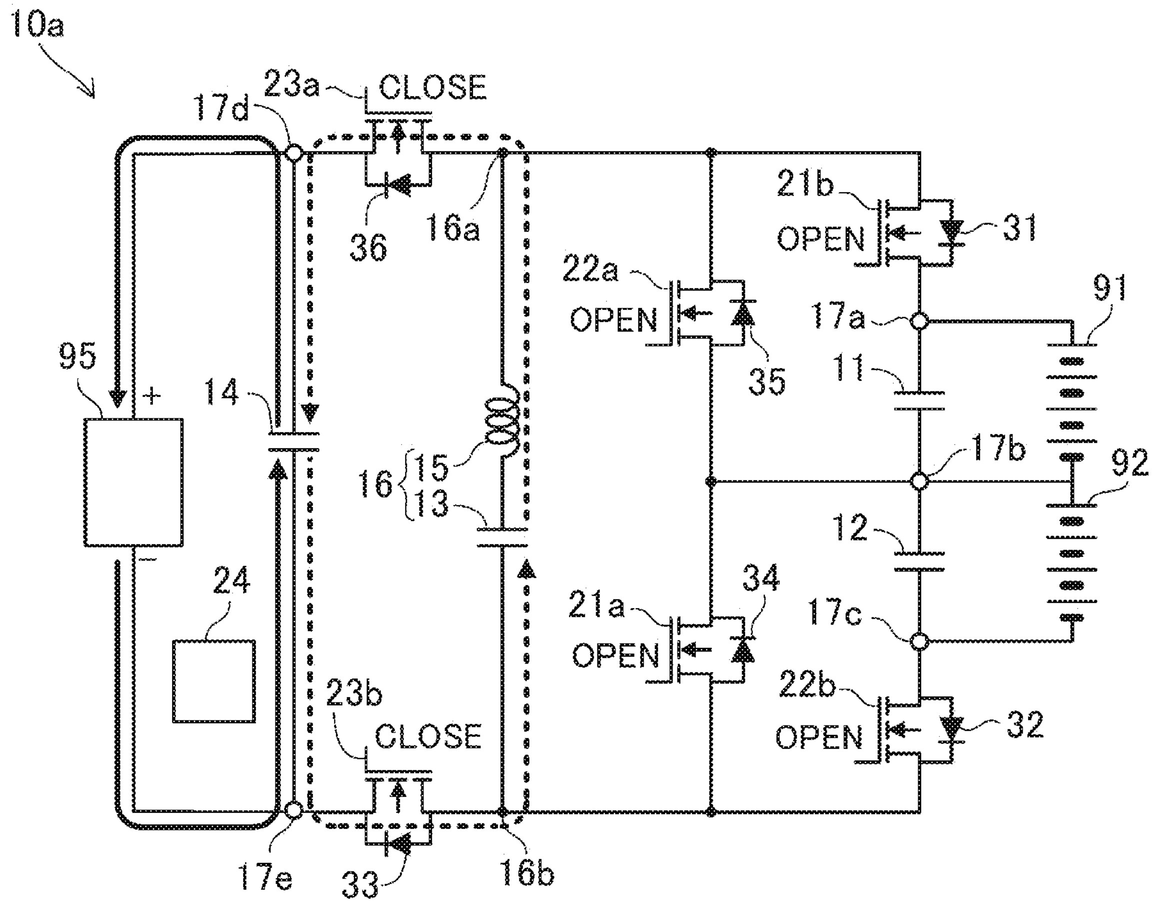
FIG. 10 is a circuit diagram of the charging circuit (third mode) according to the second embodiment.
Figure 11:
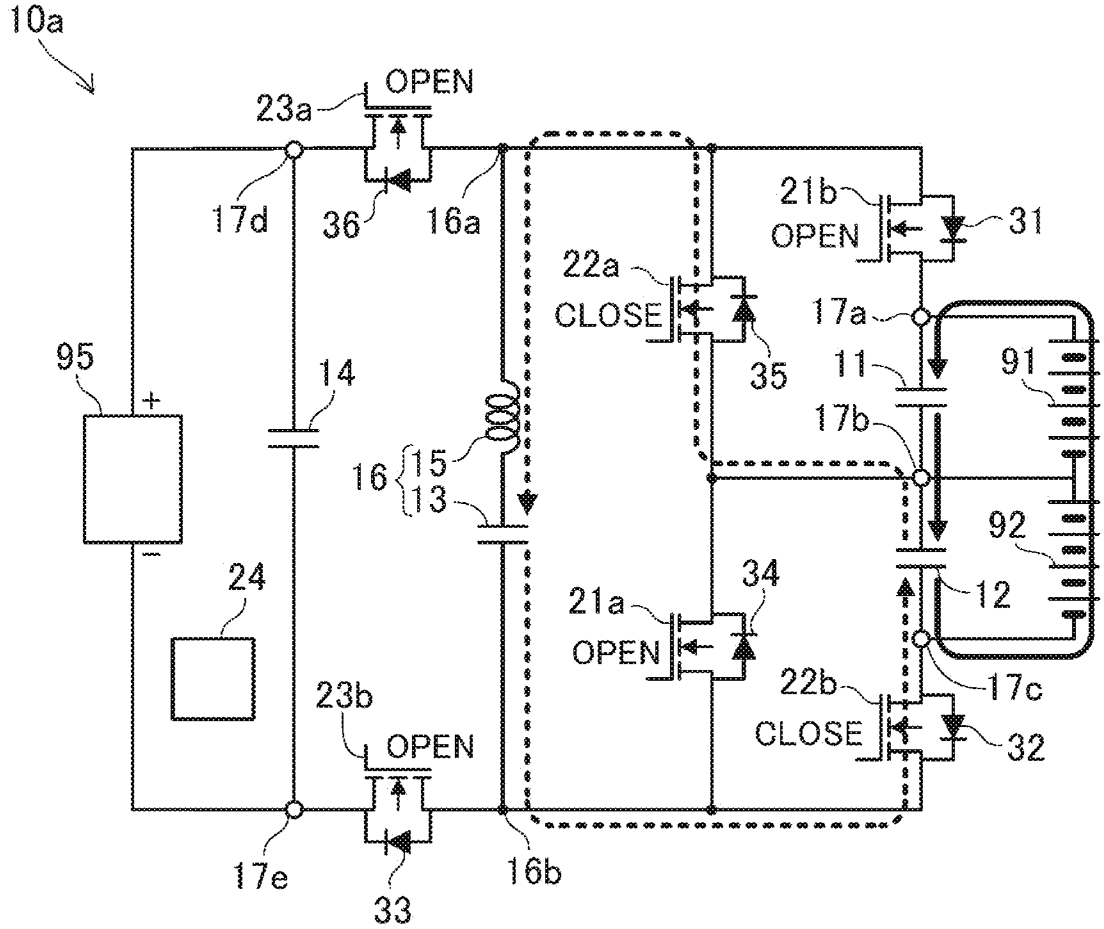
FIG. 11 is a circuit diagram of the charging circuit (second mode) according to the second embodiment.

A charging circuit 10*a* according to a second embodiment will be described with reference to FIG. 9 to FIG. 11. The charging circuit 10*a* according to the second embodiment, as in the case of the charging circuit 10 according to the first embodiment, is capable of charging batteries. In addition, the charging circuit 10*a* is capable of supplying electric power from the batteries to an electrical device. In FIG. 9 to FIG. 11, an electrical device 95 instead of the power supply 90 of FIG. 1 is connected to the charging circuit 10*a*.

FIG. 9 to FIG. 11 are circuit diagrams of the charging circuit 10*a*. The charging circuit 10*a* further includes switches 21*b*, 22*b*, 23*b* in the circuit configuration of the charging circuit 10 according to the first embodiment. In FIG. 9 to FIG. 11, reference signs 21*a*, 22*a*, and 23*a* are respectively assigned to the switches 21, 22, 23 of FIG. 1. In the charging circuit 10*a*, the first switch 21, the second switch 22, and the third switch 23 of FIG. 1 are respectively referred to as 1A switch 21*a*, 2A switch 22*a*, and 3A switch 23*a*. The newly added switches 21*b*, 22*b*, 23*b* are respectively referred to as 1B switch 21*b*, 2B switch 22*b*, and 3B switch 23*b*.

The 1B switch 21*b* is connected in parallel with the first diode 31. In other words, the 1B switch 21*b* is connected between the high-voltage side 16*a* of the series circuit 16 and the high-voltage terminal 17*a*. The 2B switch 22*b* is connected in parallel with the second diode 32. In other words, the 2B switch 22*b* is connected between the low-voltage terminal 17*c* and the low-voltage side 16*b* of the series circuit 16. The 3B switch 23*b* is connected in parallel with the third diode 33. In other words, the 3B switch 23*b* is connected between the low-voltage side 16*b* and the negative electrode input terminal 17*e*.

The controller 24 opens the 1A switch 21*a* and the 1B switch 21*b* at the same time or closes the 1A switch 21*a* and the 1B switch 21*b* at the same time. Therefore, the 1A switch 21*a* and the 1B switch 21*b* are collectively referred to as the first switch 21. The controller 24 opens the 2A switch 22*a* and the 2B switch 22*b* at the same time or closes the 2A switch 22*a* and the 2B switch 22*b* at the same time. Therefore, the 2A switch 22*a* and the 2B switch 22*b* are collectively referred to as the second switch 22. The controller 24 opens the 3A switch 23*a* and the 3B switch 23*b* at the same time or closes the 3A switch 23*a* and the 3B switch 23*b* at the same time. Therefore, the 3A switch 23*a* and the 3B switch 23*b* are collectively referred to as the third switch 23.

As in the case of the first embodiment, a state where the controller 24 closes the first switch 21 (21*a*, 21*b*) and opens the second switch 22 (22*a*, 22*b*) and the third switch 23 (23*a*, 23*b*) is referred to as first mode. A state where the controller 24 closes the second switch 22 (22*a*, 22*b*) and opens the first switch 21 (21*a*, 21*b*) and the third switch 23 (23*a*, 23*b*) is referred to as second mode. A state where the controller 24 closes the third switch 23 (23*a*, 23*b*) and opens the first switch 21 (21*a*, 21*b*) and the second switch 22 (22*a*, 22*b*) is referred to as third mode.

In the first mode, when the controller 24 closes the first switch 21 (21*a*, 21*b*) and opens the second switch 22 (22*a*, 22*b*) and the third switch 23 (23*a*, 23*b*), the first capacitor 11 (that is, the first battery 91) is connected to the series circuit 16, and the second capacitor 12 (that is, the second battery 92) and the electrical device 95 are disconnected from the series circuit 16.

In the second mode, when the controller 24 closes the second switch 22 (22*a*, 22*b*) and opens the first switch 21 (21*a*, 21*b*) and the third switch 23 (23*a*, 23*b*), the second capacitor 12 (that is, the second battery 92) is connected to the series circuit 16, and the first capacitor 11 (that is, the first battery 91) and the electrical device 95 are disconnected from the series circuit 16.

In the third mode, when the controller 24 closes the third switch 23 (23*a*, 23*b*) and opens the first switch 21 (21*a*, 21*b*) and the second switch 22 (22*a*, 22*b*), the electrical device 95 is connected to the series circuit 16, and the first capacitor 11 (that is, the first battery 91) and the second capacitor 12 (that is, the second battery 92) are disconnected from the series circuit 16.

When the power supply 90 is connected to the charging circuit 10*a* instead of the electrical device 95 and the controller 24 executes a mode switching sequence similar to the case of the first embodiment, the batteries 91, 92 are charged with electric power of the power supply 90.

When the electrical device 95 is connected to the charging circuit 10*a* and a mode switching sequence similar to the case of the first embodiment is executed, it is possible to supply electric power from the batteries 91, 92 to the electrical device 95.

FIG. 9 shows the flow of current in the first mode (power supply). The wide arrow lines in FIG. 9 represent the flow of current in the first mode (power supply). In FIG. 9 as well, the wide continuous arrow line represents the path of direct current, and the wide dashed arrow line represents the path through which a sinusoidal-wave current flows. A sinusoidal-wave current is generated as a result of resonation of the series circuit 16 (the LC resonant circuit made up of the coil 15 and the third capacitor 13).

In the first mode, the series circuit 16 is connected to the first capacitor 11 (that is, the first battery 91) through the first switch 21 (21*a*, 21*b*). When the second switch 22 (22*a*, 22*b*) and the third switch 23 (23*a*, 23*b*) are open, the series circuit 16 is disconnected from the electrical device 95 and the second capacitor 12. Before the mode switches to the first mode, the first capacitor 11 and the second capacitor 12 are charged with the first battery 91 and the second battery 92.

As the first switch 21 is closed, a current begins to flow from the first capacitor 11 to the series circuit 16. As in the case of when the batteries are charged, a current moderately increases and moderately reduces as a result of resonance between the third capacitor 13 and the coil 15. In this way, a sinusoidal-wave current flows from the first capacitor 11 to the third capacitor 13 (the dashed arrow line in FIG. 9). When the resonance half period (Tr/2) elapses from when the first switch 21 is closed, a current returns to zero, and electric energy accumulated in the third capacitor 13 is maximum.

In the 1A switch 21*a*, a current also flows through the diode 34. Therefore, in the first mode during power supply, the 1A switch 21*a* may be off (open). However, in the first mode, since a current flows from one of the terminals of the 1A switch 21*a* to the other one of the terminals (through the diode 34), the 1A switch 21*a* is in a state equivalent to an on state (closed state) in terms of circuit theory.

The controller 24 switches the mode from the first mode to the third mode. FIG. 10 shows the flow of current in the third mode (power supply). The wide arrow lines in FIG. 10 represent the flow of current in the third mode (power supply). Similarly to the circuit diagrams illustrated above, the wide continuous arrow line represents the path of direct current, and the wide dashed arrow line represents the path through which a sinusoidal-wave current flows. A sinusoidal-wave current is generated as a result of resonation of the series circuit 16 (the LC resonant circuit made up of the coil 15 and the third capacitor 13).

In the third mode, the series circuit 16 is connected to the electrical device 95 through the third switch 23 (23*a*, 23*b*). When the first switch 21 (21*a*, 21*b*) and the second switch 22 (22*a*, 22*b*) are open, the series circuit 16 is disconnected from the first capacitor 11 (first battery 91) and the second capacitor 12 (second battery 92).

As the third switch 23 is closed, a current begins to flow from the third capacitor 13 to the fourth capacitor 14. As in the case of when the batteries are charged, a sinusoidal-wave current flows from the third capacitor 13 to the fourth capacitor 14 (the dashed arrow line in FIG. 10) as a result of resonance of the third capacitor 13 and the coil 15. When the resonance half period (Tr/2) elapses from when the third switch 23 is closed, a current returns to zero, and the entire electric energy accumulated in the third capacitor 13 transfers to the fourth capacitor 14. With the electric energy, electric power is supplied from the fourth capacitor 14 to the electrical device 95.

In the 3A switch 23*a*, a current also flows through the diode 36. Therefore, in the third mode during power supply, the 3A switch 23*a* may be off (open). However, in the third mode, since a current flows from one of the terminals of the 3A switch 23*a* to the other one of the terminals (through the diode 36), the 3A switch 23*a* is in a state equivalent to an on state (closed state) in terms of circuit theory.

FIG. 11 shows the flow of current in the second mode (power supply). The wide arrow lines in FIG. 11 represent the flow of current in the second mode (power supply). In FIG. 11 as well, the wide continuous arrow line represents the path of direct current, and the wide dashed arrow line represents the path through which a sinusoidal-wave current flows. A sinusoidal-wave current is generated as a result of resonation of the series circuit 16 (the LC resonant circuit made up of the coil 15 and the third capacitor 13).

In the second mode, the series circuit 16 is connected to the second capacitor 12 (that is, the second battery 92) through the second switch 22 (22*a*, 22*b*). When the first switch 21 (21*a*, 21*b*) and the third switch 23 (23*a*, 23*b*) are open, the series circuit 16 is disconnected from the electrical device 95 and the first capacitor 11. Before the mode switches to the second mode, the first capacitor 11 and the second capacitor 12 are charged with the first battery 91 and the second battery 92.

As the second switch 22 is closed, a current begins to flow from the second capacitor 12 to the third capacitor 13. A sinusoidal-wave current flows from the second capacitor 12 to the third capacitor 13 (the dashed arrow line in FIG. 11) as a result of resonance between the third capacitor 13 and the coil 15. When the resonance half period (Tr/2) elapses from when the second switch 22 is closed, a current returns to zero, and electric energy accumulated in the third capacitor 13 is maximum.

When the controller 24 switches the mode from the second mode to the third mode, a current flows from the third capacitor 13 to the fourth capacitor 14, and electric power is accumulated in the fourth capacitor 14, as in the case of when the mode is switched from the first mode to the third mode. Electric power is supplied from the fourth capacitor 14 to the electrical device 95.

In the 2A switch 22*a*, a current also flows through the diode 35. Therefore, in the second mode during power supply, the 2A switch 22*a* may be off (open). However, in the second mode, since a current flows from one of the terminals of the 2A switch 22*a* to the other one of the terminals (through the diode 35), the 2A switch 22*a* is in a state equivalent to an on state (closed state) in terms of circuit theory.

The controller 24 controls the switches 21 (21*a*, 21*b*), 22 (22*a*, 22*b*), 23 (23*a*, 23*b*) such that the mode switches in order of the first mode, the third mode, the second mode, and the third mode. The controller 24 controls the switches such that the mode repeatedly switches. Therefore, a process that "the mode is switched in order of the first mode, the third mode, the second mode, and the third mode" is equivalent to a process that "the mode is switched in order of the third mode, the first mode, the third mode, and the second mode".

In this way, the charging circuit 10*a* according to the second embodiment is capable of charging the batteries when a power supply is connected, and is capable of supplying electric power from the batteries to an electrical device when the electrical device is connected. The controller 24 is capable of implementing both charging and power supply with the same mode switching sequence.

Figure 12A:
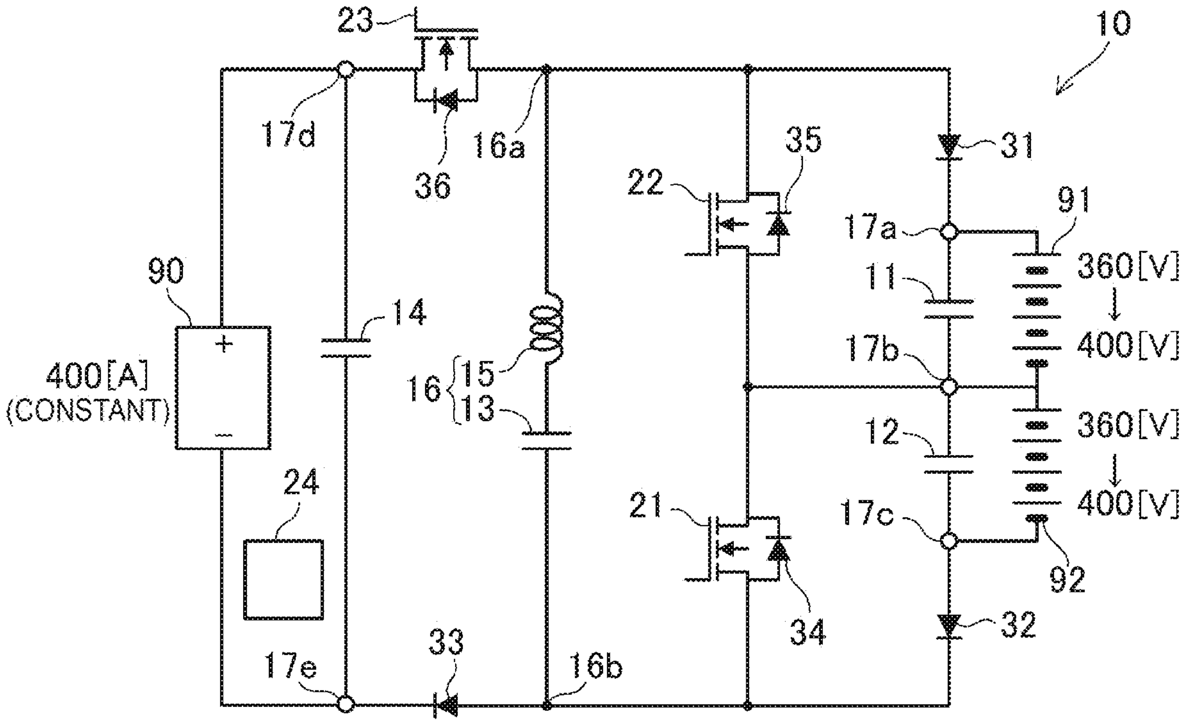
FIG. 12A and FIG. 12B are diagrams that show examples of charging.
Figure 12B:
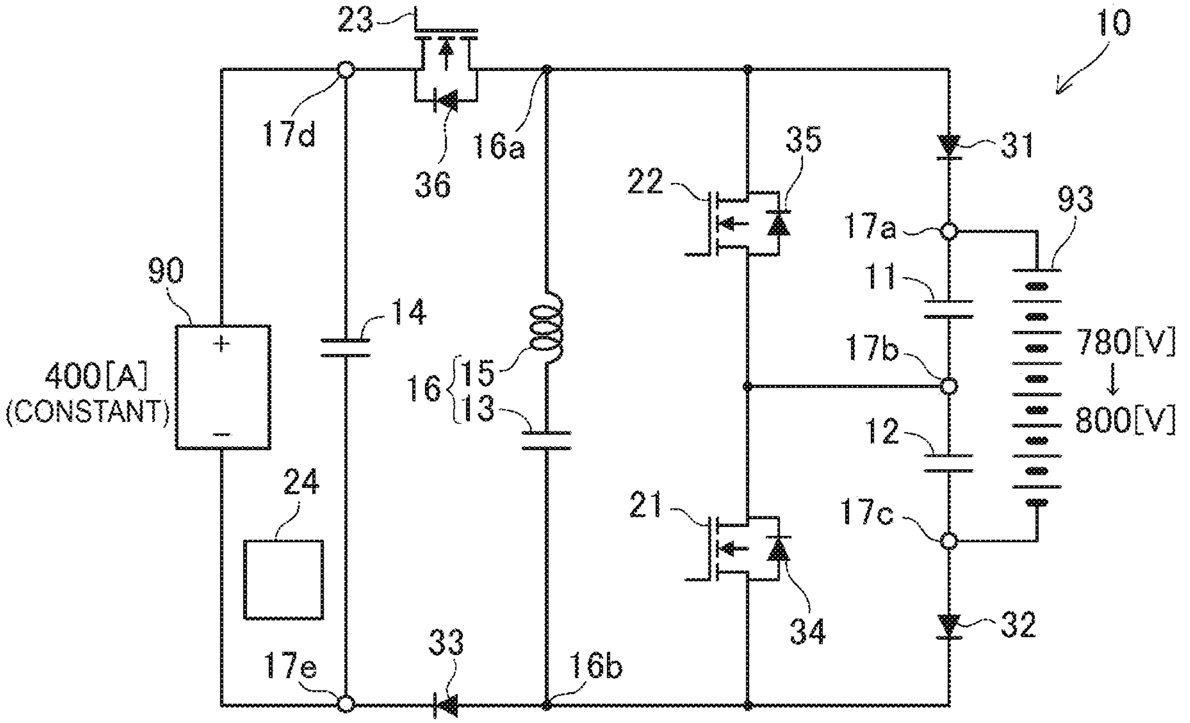

FIG. 12A and FIG. 12B show examples of the relationship between the power supply and the batteries at the time of charging. FIG. 12A is an example of charging two batteries (the first battery 91 and the second battery 92). FIG. 12A is an example in which the first battery 91 having 360 V is connected between the high-voltage terminal 17*a* and the intermediate-voltage terminal 17*b* and the second battery 92 having 360 V is connected between the intermediate-voltage terminal 17*b* and the low-voltage terminal 17*c*. The power supply 90 is capable of supplying a constant current of 400 A. When the controller 24 executes the above-described mode switching sequence, the first battery 91 and the second battery 92 both are charged to 400 V. The "above-described mode switching sequence" is that the controller 24 controls the switches 21, 22, 23 such that the mode is repeated in order of the third mode, the first mode, the third mode, and the second mode.

FIG. 12B is an example of charging one battery (third battery 93). FIG. 12B is an example in which the third battery 93 having 780 V is connected between the high-voltage terminal 17*a* and the low-voltage terminal 17*c*. The power supply 90 is capable of supplying a constant current of 400 A. When the controller 24 executes the above-described mode switching sequence, the third battery 93 is charged to 800 V.

The examples of FIG. 12A and FIG. 12B hold even when the charging circuit 10 is replaced with the charging circuit 10*a*.

Figure 13A:
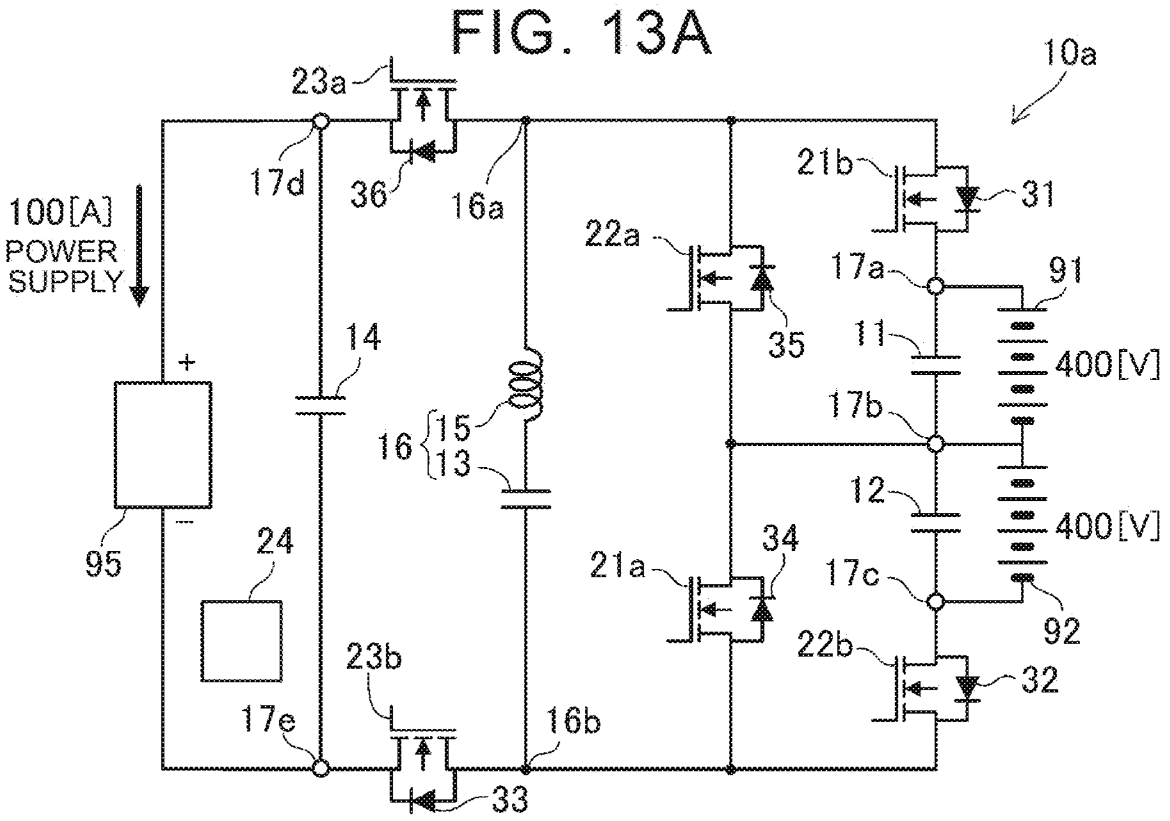
FIG. 13A and FIG. 13B are diagrams that show examples of power supply.
Figure 13B:
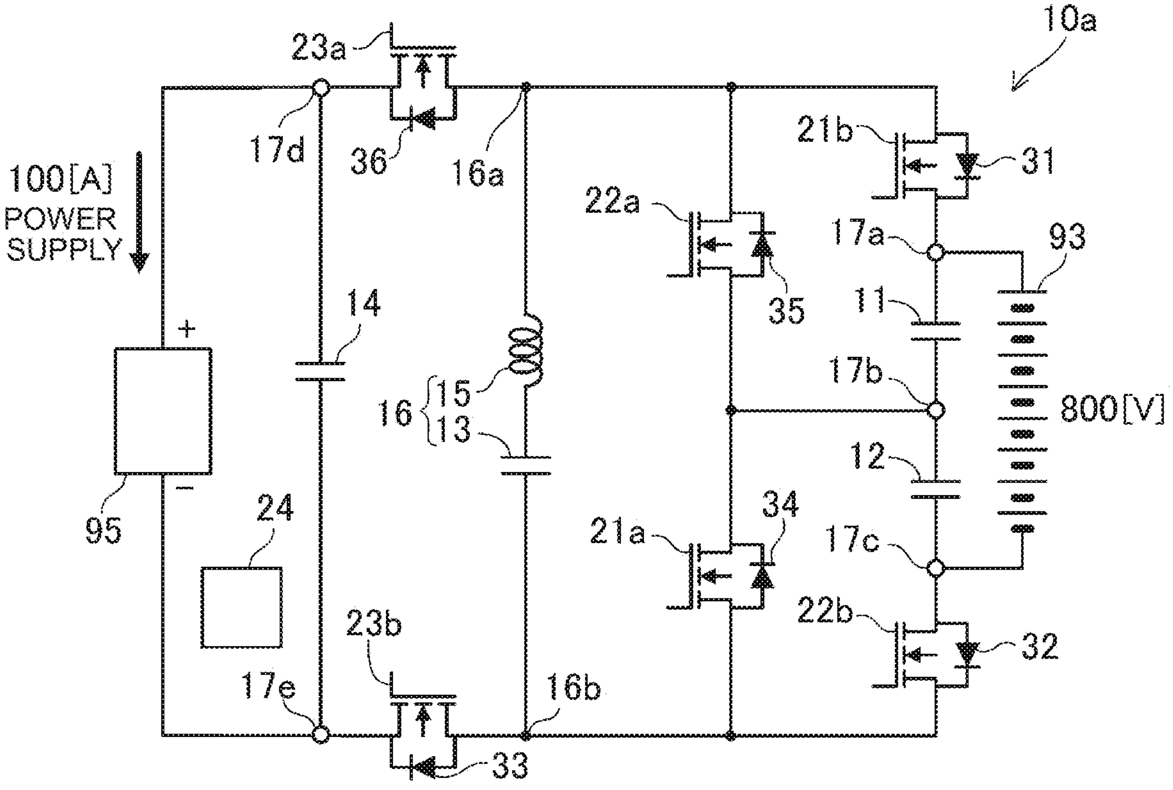

FIG. 13A and FIG. 13B show examples of the relationship between the power supply and the batteries at the time of power supply. FIG. 13A is an example in which electric power is supplied to the electrical device 95 by using two batteries (the first battery 91 and the second battery 92). In the case of power supply, the charging circuit 10*a* according to the second embodiment is used. The first battery 91 having 400 V is connected between the high-voltage terminal 17*a* and intermediate-voltage terminal 17*b* of the charging circuit 10*a*, and the second battery 92 having 400 V is connected between the intermediate-voltage terminal 17*b* and the low-voltage terminal 17*c*. When the controller 24 executes the above-described mode switching sequence, a constant current of 100 A is supplied from the charging circuit 10*a* to the electrical device 95.

FIG. 13B is an example in which electric power is supplied to the electrical device 95 by using one battery (the third battery 93). The third battery 93 having 800 V is connected between the high-voltage terminal 17*a* and low-voltage terminal 17*c* of the charging circuit 10*a*. When the controller 24 executes the above-described mode switching sequence, a constant current of 100 A is supplied from the charging circuit 10*a* to the electrical device 95.

As described above, the charging circuits 10, 10*a* are capable of charging the first battery 91 and the second battery 92 at the same time. Particularly, the charging circuits 10, 10*a* force a current (electric power) into the batteries by using electric energy accumulated in the third capacitor 13, it is possible to shorten a charging time. The charging circuit 10*a* is capable of supplying electric power from the batteries 91, 92 to the electrical device 95. A mode switching sequence at the time of supplying electric power may be the same as the mode switching sequence at the time of charging.

The controller 24 controls the switches 21, 22, 23 such that the mode switches at time intervals corresponding to the resonance half period (Tr/2) of the resonant circuit (series circuit 16) made up of the coil 15 and the third capacitor 13. When the mode is switched (the switches are switched) at every resonance half period (Tr/2), switching losses can be reduced.

A preferable relationship between the voltage of the direct-current power supply 90 and a battery voltage will be described. When two batteries (the first battery 91 and the second battery 92) are charged, the voltage of the direct-current power supply 90 is desirably equal to the voltage of each of the batteries. The voltage of the direct-current power supply 90 may be twice as high as the voltage of each of the batteries.

When one battery (the third battery 93) is charged, the voltage of the direct-current power supply 90 is desirably half the voltage of one battery. The voltage of the direct-current power supply 90 may be equal to the voltage of one battery. The charging circuit 10 forces a current (electric power) into the battery by using electric energy accumulated in the third capacitor 13, so the voltage of the direct-current power supply 90 may be lower than the voltage of the battery.

In the charging circuit 10*a* according to the second embodiment, the 3B switch 23*b* may be omitted. The arrangement of the first switch 21 in FIG. 1 to FIG. 3 is an example. The first switch 21 is not limited to the configuration shown in FIG. 1 to FIG. 3. The first switch 21 just needs to be a switch capable of connecting the series circuit 16 to the first capacitor 11 and disconnecting the series circuit 16 from the first capacitor 11.

Similarly, the arrangement of the second switch 22 and the third switch 23 in FIG. 1 to FIG. 3 is also an example. The second switch 22 just needs to be a switch capable of connecting the series circuit 16 to the second capacitor 12 and disconnecting the series circuit 16 from the second capacitor 12. The third switch 23 just needs to be a switch capable of connecting the series circuit 16 to the direct-current power supply 90 and disconnecting the series circuit 16 from the direct-current power supply 90.

Specific examples of the disclosure are described in detail above; however, these are only illustrative and are not intended to limit the appended claims. The technology described in the appended claims also encompasses various modifications and changes from the specific examples illustrated above. The technical elements described in the specification or the drawings exhibit technical usability solely or various combinations and are not limited to combinations of the appended claims at the time of filing the application. The technology illustrated in the specification and drawings can achieve multiple purposes at the same time and has technical usability by achieving one of those purposes.

What is claimed is:

1. A charging circuit comprising:

a first voltage terminal to which a positive electrode of a first battery is connected;

a second voltage terminal to which a negative electrode of the first battery and a positive electrode of a second battery are connected;

a third voltage terminal to which a negative electrode of the second battery is connected;

a first capacitor connected between the first voltage terminal and the second voltage terminal;

a second capacitor connected between the second voltage terminal and the third voltage terminal;

a series circuit made up of a coil and a third capacitor connected in series with each other;

a fourth capacitor connected in parallel with a power supply;

a first switch configured to connect the series circuit between the first voltage terminal and the second voltage terminal;

a second switch configured to connect the series circuit between the second voltage terminal and the third voltage terminal;

a third switch configured to connect the series circuit to the power supply and the fourth capacitor; and a controller configured to control the first switch, the second switch, and the third switch, wherein:

the controller is configured to switch a mode among a first mode in which the first switch is closed and the second switch and the third switch are open, a second mode in which the second switch is closed and the first switch and the third switch are open, and a third mode in which the third switch is closed and the first switch and the second switch are open; and the controller is configured to control the first switch, the second switch, and the third switch such that the mode is repeated in order of the third mode, the first mode, the third mode, and the second mode.

2. The charging circuit according to claim 1, wherein the controller is configured to control the first switch, the second switch, and the third switch such that the first mode, the second mode, and the third mode sequentially switch at time intervals of a half of a resonance period of a resonant circuit made up of the coil and the third capacitor.

3. The charging circuit according to claim 1, further comprising:

a first diode of which an anode is connected to a high-voltage side of the series circuit and a cathode is connected to the first voltage terminal; and a second diode of which an anode is connected to the third voltage terminal and a cathode is connected to a low-voltage side of the series circuit, wherein:

the first switch is connected between the second voltage terminal and the low-voltage side; and the second switch is connected between the high-voltage side and the second voltage terminal.

4. The charging circuit according to claim 1, wherein:

the first switch includes a 1A switch and a 1B switch;

the second switch includes a 2A switch and a 2B switch;

the 1A switch is connected between the second voltage terminal and a low-voltage side of the series circuit;

the 1B switch is connected between a high-voltage side of the series circuit and the first voltage terminal;

the 2A switch is connected between the high-voltage side and the second voltage terminal; and the 2B switch is connected between the third voltage terminal and the low-voltage side.

5. The charging circuit according to claim 4, further comprising:

a first diode of which an anode is connected to the high-voltage side of the series circuit and a cathode is connected to the first voltage terminal; and a second diode of which an anode is connected to the third voltage terminal and a cathode is connected to the low-voltage side of the series circuit, wherein:

the 1B switch is connected in parallel with the first diode; and the 2B switch is connected in parallel with the second diode.

6. The charging circuit according to claim 4, wherein the third switch includes a 3A switch connected between the high-voltage side and a positive electrode input terminal of the charging circuit and a 3B switch connected between the low-voltage side and a negative electrode input terminal of the charging circuit.

* * * * *